United States Patent
Wang et al.

(10) Patent No.: US 11,162,867 B2
(45) Date of Patent: Nov. 2, 2021

(54) LEAK DETECTION IN VISCOELASTIC PIPES BY MATCHED-FIELD PROCESSING METHOD

(71) Applicant: The Hong Kong University of Science and Technology, Hong Kong (CN)

(72) Inventors: Xun Wang, Hong Kong (CN); Mohamed Salah Ghidaoui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 28 days.

(21) Appl. No.: 15/929,835

(22) Filed: May 26, 2020

(65) Prior Publication Data
US 2020/0393325 A1 Dec. 17, 2020

Related U.S. Application Data

(60) Provisional application No. 62/921,331, filed on Jun. 12, 2019.

(51) Int. Cl.
*G01M 3/28* (2006.01)
*G06F 17/11* (2006.01)

(52) U.S. Cl.
CPC ........... *G01M 3/2815* (2013.01); *G06F 17/11* (2013.01)

(58) Field of Classification Search
CPC .............................. G01M 3/2815; G06F 17/11
See application file for complete search history.

(56) References Cited

U.S. PATENT DOCUMENTS

| 5,428,989 A * | 7/1995 | Jerde ...................... G01M 3/243 73/40.5 R |
| 11,060,668 B2 * | 7/2021 | Simpson .................... F17D 5/06 |
| 2009/0322544 A1 * | 12/2009 | McDowell ........... G01M 3/2815 340/605 |

(Continued)

OTHER PUBLICATIONS

Wang et al., "Matched-Field Processing Method For Leak Detection in a Pipe", 37th IAHR World Congress, Kuala Lumpur, Malaysia Aug. 13-18, 2017 (Year: 2017).*

(Continued)

*Primary Examiner* — Regis J Betsch
(74) *Attorney, Agent, or Firm* — Spruson & Ferguson (Hong Kong) Limited

(57) ABSTRACT

A leakage location in a viscoelastic pipe is estimated by generating a transient wave at a downstream node of the pipe. Liquid pressures at plural locations along the pipe are measured. Measured signals are transformed to frequency response functions (FRFs). The FRF from a sensor closest to the upstream node is used to estimate a FRF of transient discharge at the upstream node. A frequency-dependent wave speed of the transient wave is computed according to geometrical dimensions and viscoelastic coefficients of the pipe via the generalized Kelvin-Voigt model. FRFs of liquid pressures at the locations under a hypothetical no-leakage condition are computed according to the FRF of transient discharge and the frequency-dependent wave speed. By using the matched-field processing (MFP) method, which maximizes the signal-to-noise ratio in detection, the leakage location is estimated from the FRFs of liquid pressures.

20 Claims, 5 Drawing Sheets

(56) References Cited

U.S. PATENT DOCUMENTS

2014/0174186 A1     6/2014    Salomon
2018/0128660 A1*   5/2018    Lee .......................... G01F 1/66

OTHER PUBLICATIONS

Duan et al., "System Response Function-Based Leak Detection in Viscoelastic Pipelines", Journal of Hydraulic Engineering Feb. 2012 (Year: 2012).*
X. Wang and M. S. Ghidaoui (2018), "Pipeline leak detection using the matched-field processing method," Journal of Hydraulic Engineering, 144(6), 04018030.
H. F. Duan, P. J. Lee, M. S. Ghidaoui and Y. K. Tung (2011), "System response function-based leak detection in viscoelastic pipelines," Journal of Hydraulic Engineering, 138(2), 143-153.
A. K. Soares, D. I. Covas and L. F. R. Reis (2011), "Leak detection by inverse transient analysis in an experimental PVC pipe system," Journal of Hydroinformatics, 13(2), 153-166.

* cited by examiner

LEAK DETECTION IN VISCOELASTIC PIPES BY MATCHED-FIELD PROCESSING METHOD

CROSS-REFERENCE TO RELATED APPLICATIONS

This application claims the benefit of U.S. Provisional Patent Application No. 62/921,331, filed on Jun. 12, 2019, the disclosure of which is hereby incorporated by reference in its entirety.

LIST OF ABBREVIATIONS

FRF Frequency response function
HDPE High-density polyethylene
I/O Input/output
K-V Kelvin-Voigt
MFP Matched-field processing
PE Polyethylene
PVC Polyvinyl chloride
SNR Signal-to-noise ratio

TECHNICAL FIELD

The present disclosure generally relates to estimation of a leak location in a pipe that carries a liquid by using a MFP method. In particular, the present disclosure relates to method and system for estimating a leak location in a viscoelastic pipe.

BACKGROUND

In a municipal water-supply system, a pipe is often buried underground. Accurate determination of a water-leakage location of the pipe is of considerable importance before carrying out repair works. However, noise is ubiquitous in real water-supply pipeline systems due to nearby vehicular traffic, vibration of mechanical pumps, turbulence, etc. Most existing techniques for leakage location determination, such as the one disclosed in US 2014/0174186, do not take into consideration the presence of noise in the determination.

A recently introduced method, known as the MFP method, is designed to estimate a leakage location based on maximizing a SNR in detection such that the MFP method provides a good estimate of leakage location even in a noisy environment. The MFP method is capable of using all available frequencies, not just resonant frequencies, in leakage location estimation, so that the MFP method is more robust. In the disclosure of X. WANG and M. S. GHIDAOUI (2018), entitled "Pipeline leak detection using the matched-field processing method," published in *Journal of Hydraulic Engineering*, 144(6), 04018030, the MFP technique for leakage location estimation is developed based on a transient wave model in an elastic pipe. However, the effect of pipe-wall viscoelasticity in the transient wave is not considered.

Viscoelastic pipes, such as those formed by PVC, PE, and HDPE, are often and advantageously used in realizing urban water-supply systems due to excellence in resilience, energy absorption capacity, low cost, and convenience in pipe construction and maintenance. The viscoelastic effect of pipe deformation during transient pressure behavior has been investigated, showing that the viscoelastic behavior changes the form and magnitude of transient wave. Leak detection methods that can deal with pipe viscoelasticity have been proposed, e.g., in the disclosure of H. F. DUAN, P. J. LEE, M. S. GHIDAOUI and Y. K. TUNG (2011), entitled "System response function-based leak detection in viscoelastic pipelines," published in *Journal of Hydraulic Engineering*, 138(2), 143-153, and in the disclosure of A. K. SOARES, D. I. COVAS and L. F. R. REIS (2011), entitled "Leak detection by inverse transient analysis in an experimental PVC pipe system," published in *Journal of Hydroinformatics*, 13(2), 153-166. However, these methods do not consider the effect of noise in their models and therefore may not be applicable in real water-supply pipeline systems in the presence of strong noise. In addition, these methods do not take advantage of the information available in all frequencies.

As such, existing leakage-location determination techniques do not consider both the effects of noise and pipe-wall viscoelasticity. There is a need in the art for a leakage-location determination technique that considers both of these effects.

SUMMARY

Mathematical equations referenced in this Summary can be found in Detailed Description.

A first aspect of the present disclosure is to provide a first method for estimating a leakage location $x^L$ of a viscoelastic pipe. The pipe has an upstream node and a downstream node respectively located at $x^U$ and $x^D$ of the pipe for allowing a liquid to flow along the pipe from $x^U$ to $x^D$. The pipe has a constant pressure at $x^U$.

In the first method, a transient wave is generated at $x^D$, whereby the transient wave propagates back and forth along the pipe between $x^D$ and $x^U$ and produces at least a transient discharge at $x^U$. Liquid pressures at locations $x_0, x_1, \ldots, x_M$ of the pipe are measured at least during the propagation of the transient wave along the pipe to thereby yield $h(x_m, t)$, $m=0, \ldots, M$, where $h(x_m, t)$ is a time-domain signal of liquid pressure measured at $x_m$, wherein M is at least two and $x_0$ is nearest to $x^U$ among the M+1 locations. For $m=0, \ldots, M$, a FRF of liquid pressure measured at $x_m$, denoted as $h(x_m, \omega)$, is computed according to $h(x_m, t)$. A frequency-dependent wave speed $a_{ve}(\omega)$ of the transient wave traveling in the pipe is also computed according to geometrical dimensions and viscoelastic coefficients of the pipe. Afterwards, $\hat{q}(x^U, \omega)$, a FRF of the transient discharge at $x^U$, is estimated according to $h(x_0, \omega)$ and $a_{ve}(\omega)$. A FRF of liquid pressure measured at $x_m$ under a hypothetical condition of no leakage, denoted as $h^{NL}(x_m, \omega)$, is computed according to $\hat{q}(x^U, \omega)$ and $a_{ve}(\omega)$. The computation of $h^{NL}(x_m, \omega)$ is performed for $m=0, \ldots, M$. Additionally, $a_{ve}(\omega)$, $\hat{q}(x^U, \omega)$ and $h^{NL}(x_m, \omega)$ are computed by EQNS. (19), (21) and (24), respectively. In the first method, a plurality of K frequencies $\omega_1, \omega_2, \ldots, \omega_K$ is selected. MFP is applied to a head difference $\overrightarrow{\Delta h}$ to estimate $x^L$, where $\overrightarrow{\Delta h}$ is given by EQN. (25).

In certain embodiments, the application of MFP to $\overrightarrow{\Delta h}$ to estimate $x^L$ comprises plotting an objective function $O(x^L)$ given by EQN. (26) on a graph with respect to $x^L$ to thereby allow a person to identify a particular value of $x^L$ corresponding to maximum $O(x^L)$ on the graph as an estimate of $x^L$. Alternatively, $x^L$ may be estimated from $\overrightarrow{\Delta h}$ by EQN. (29).

The transient wave may be a step wave generated by closing the downstream node for a predetermined closing duration. In certain embodiments, $\omega_K$ is highest in the plurality of K frequencies and is selected to be less than $2\pi/T_c$, where $T_c$ is the predetermined closing duration.

In certain embodiments, $h(x_m, \omega)$, $a_{ve}(\omega)$, $\hat{q}(x^U, \omega)$ and $h^{NL}(x_m, \omega)$ are computed or estimated at $\omega=\omega_1, \omega_2, \ldots, \omega_K$. Values of $h(x_m, \omega)$ at $\omega=\omega_1, \omega_2, \ldots, \omega_K$ may be computed according to $h(x_m, t)$ by EQN. (20).

In certain embodiments, the plurality of K frequencies is selected such that $\omega_1$ is a lowest frequency in the plurality of K frequencies and each of $\omega_2, \ldots, \omega_K$ is a multiple of $\omega_1$.

In certain embodiments, M is selected to be M=2.

A second aspect of the present disclosure is to provide a system for estimating a leakage location $x^L$ of a viscoelastic pipe. The pipe has an upstream node and a downstream node respectively located at $x^U$ and $x^D$ of the pipe for allowing a liquid to flow along the pipe from $x^U$ to $x^D$. The pipe has a constant pressure at $x^U$.

The system comprises plural sensors and one or more computing devices. The sensors are arranged to be distributed on locations $x_0, x_1, \ldots, x_M$ of the pipe for measuring liquid pressures at the M+1 locations, where M is at least two and $x_0$ is nearest to $x^U$ among the M+1 locations. The one or more computing devices are configured to control the sensors and to execute a process. The process comprises: synchronizing with an event of generating a transient wave at $x^D$, the event causing the transient wave to propagate back and forth along the pipe between $x^D$ and $x^U$ and to produce at least a transient discharge at $x^U$; controlling the sensors to measure the liquid pressures at the M+1 locations at least during propagation of the transient wave along the pipe; receiving $h(x_m, t)$, $m=0, \ldots, M$, from the sensors where $h(x_m, t)$ is a time-domain signal of liquid pressure measured at $x_m$; computing $h(x_m, \omega)$, a FRF of liquid pressure measured at $x_m$, according to $h(x_m, t)$ for $m=0, \ldots, M$; computing a frequency-dependent wave speed $a_{ve}(\omega)$ of the transient wave traveling in the pipe according to geometrical dimensions and viscoelastic coefficients of the pipe; estimating $\hat{q}(x^U, \omega)$, a FRF of the transient discharge at $x^U$, according to $h(x_0, \omega)$ and $a_{ve}(\omega)$; estimating $h^{NL}(x_m, \omega)$, a FRF of liquid pressure measured at $x_m$ under a hypothetical condition of no leakage, for $m=0, \ldots, M$ according to $\hat{q}(x^U, \omega)$ and $a_{ve}(\omega)$; selecting a plurality of K frequencies $\omega_1, \omega_2, \ldots, \omega_K$; and applying MFP to a head difference $\overrightarrow{\Delta h}$ to estimate $x^L$ where $\overrightarrow{\Delta h}$ is given by EQN. (25). Additionally, $a_{ve}(\omega)$, $\hat{q}(x^U, \omega)$ and $h^{NL}(x_m, \omega)$ are computed by EQNS. (19), (21) and (24), respectively.

In certain embodiments, the system further comprises an I/O device used for communicating with a user. The I/O device is communicable with the one or more computing devices. The synchronizing of the transient-wave generating event comprises: configuring the I/O device to notify the user to generate the transient wave at $x^D$; or configuring the I/O device to receive a message from the user that the transient wave is about to be generated.

In certain embodiments, the one or more computing devices are configured to control a transient generator used for generating the transient wave. The synchronization of the transient-wave generating event comprises controlling the transient generator to close the downstream node for a predetermined closing duration so as to generate the transient wave.

A third aspect of the present disclosure is to provide a second method for estimating a leakage location $x^L$ of a viscoelastic pipe. The pipe has an upstream node and a downstream node respectively located at $x^U$ and $x^D$ of the pipe for allowing a liquid to flow along the pipe from $x^U$ to $x^D$. The pipe has a constant pressure at $x^U$. The second method is a computer-implemented method.

The second method comprises: obtaining M+1 time-domain signals of liquid pressures respectively measured at locations $x_0, x_1, \ldots, x_M$ of the pipe, the liquid pressures being measured at least during propagation of a transient wave along the pipe, the transient wave propagating back and forth along the pipe between $x^D$ and $x^U$ and producing at least a transient discharge at $x^U$, M being at least two, $x_0$ being nearest to $x^U$ among the M+1 locations; computing $h(x_m, \omega)$, a FRF of liquid pressure measured at $x_m$, according to $h(x_m, t)$ for $m=0, \ldots, M$, where $h(x_m, t)$ is a respective time-domain signal of liquid pressure measured at $x_m$; computing a frequency-dependent wave speed $a_{ve}(\omega)$ of the transient wave traveling in the pipe according to geometrical dimensions and viscoelastic coefficients of the pipe; estimating $\hat{q}(x^U, \omega)$, a FRF of the transient discharge at $x^U$, according to $h(x_0, \omega)$ and $a_{ve}(\omega)$; estimating $h^{NL}(x_m, \omega)$, a FRF of liquid pressure measured at $x_m$ under a hypothetical condition of no leakage, for $m=0, \ldots, M$ according to $\hat{q}(x^U, \omega)$ and $a_{ve}(\omega)$; selecting a plurality of K frequencies $\omega_1, \omega_2, \ldots, \omega_K$; and applying MFP to a head difference $\overrightarrow{\Delta h}$ to estimate $x^L$ where $\overrightarrow{\Delta h}$ is given by EQN. (25). Additionally, $a_{ve}(\omega)$, $\hat{q}(x^U, \omega)$ and $h^{NL}(x_m, \omega)$ are computed by EQNS. (19), (21) and (24), respectively.

In certain embodiments, the application of MFP to $\overrightarrow{\Delta h}$ to estimate $x^L$ comprises plotting an objective function $O(x^L)$ given by EQN. (26) on a graph with respect to $x^L$ to thereby allow a person to identify a particular value of $x^L$ corresponding to maximum $O(x^L)$ on the graph as an estimate of $x^L$. Alternatively, $x^L$ may be estimated from $\overrightarrow{\Delta h}$ by EQN. (29).

In certain embodiments, $h(x_m, \omega)$, $a_{ve}(\omega)$, $\hat{q}(x^U, \omega)$ and $h^{NL}(x_m, \omega)$ are computed or estimated at $\omega=\omega_1, \omega_2, \ldots, \omega_K$. Values of $h(x_m, \omega)$ at $\omega=\omega_1, \omega_2, \ldots, \omega_K$ may be computed according to $h(x_m, t)$ by EQN. (20).

In certain embodiments, the plurality of K frequencies is selected such that $\omega_1$ is a lowest frequency in the plurality of K frequencies and each of $\omega_2, \ldots, \omega_K$ is a multiple of $\omega_1$.

Other aspects of the present disclosure are disclosed as illustrated by the embodiments hereinafter.

DETAILED DESCRIPTION

In the present disclosure, a technique for estimating a leakage location in a viscoelastic pipe is provided. In particular, the MFP method is used to maximize the SNR in detection. A leakage-location estimation scheme based on the MFP method is first derived. Based on the scheme, various embodiments of method and system as disclosed herein for estimating the leakage location in the pipe are developed.

A. Pipeline System Model

Figure 1:
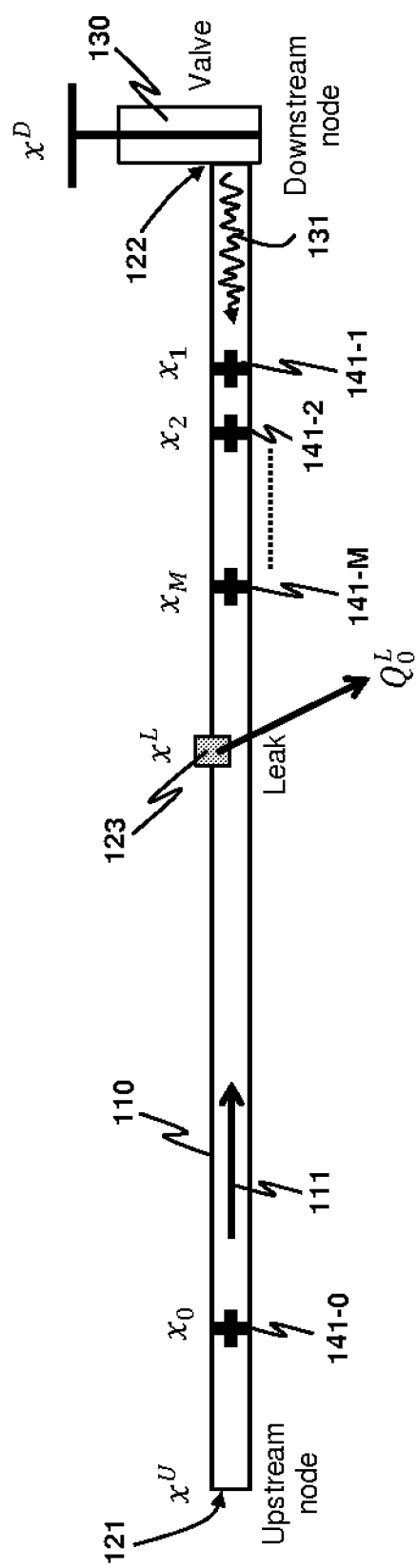
FIG. 1 depicts a pipeline system model used for developing a leakage-location estimation algorithm.

FIG. 1 depicts a pipeline system model under consideration. In the model, a pipe 110 is used to transport a liquid from an upstream node 121 to a downstream node 122 along a liquid-flowing direction 111. A constant pressure is maintained at the upstream node 121 by, e.g., connecting the upstream node to a reservoir, a tank or a centrifugal pump. The pipe 110 has a leak 123 such that a portion of the liquid is leaked out. A valve 130 is located at the downstream node 122. The valve 130 is suddenly closed so as to produce a transient wave 131 propagating back and forth between the downstream node 122 and the upstream node 121, causing transient discharges to occur along the pipe 110. Note that at least a transient discharge at the upstream node 121 is produced. Also note that the transient wave generated is a step wave in general, and is not classified as an impulse wave. Along the pipe 110, M+1 sensors 141-0:M are installed at M+1 different locations $x_0, x_1, \ldots, x_M$ for measuring liquid pressures at these locations at least during propagation of the transient wave 131. In particular, the M+1 sensors 141-0:M include a zeroth sensor 141-0 installed at $x_0$, which is closest to the upstream node 121 among the M+1 locations. The zeroth sensor 141-0 is used for measuring the transient discharge at the upstream node 121. The MFP method is used to process data measured by the M+1 sensors and hence estimate a location of the leak 123.

The upstream node 121 and the downstream node 122 of the pipe 110 are located at $x^U$ and $x^D$, respectively, of the pipe 110. Let $x^L$ denote the location of the leak 123 on the pipe 110. Let $z^L$, $Q_0^L$ and $H_0^L$ denote the elevation of the pipe 110 at the leak 123, the steady-state discharge and the liquid pressure at the leak 123, respectively. The lumped peak parameter $s^L = C^d A^L$ stands for the effective leak size, where $C^d$ is the discharge coefficient of the leak 123 and $A^L$ is the flow area of the leak opening (orifice). The steady-state discharge of the leak 123 is related to the lumped leak parameter by $Q_0^L = s^L \sqrt{2g(H_0^L - z^L)}$, in which $g = 9.81$ ms$^{-2}$ is the gravitational constant.

B. Transient Wave in Viscoelastic Pipe

For a viscoelastic pipe, the total strain E can be decomposed into an instantaneous-elastic strain $\epsilon_e$ and a retarded strain $\epsilon_r$, i.e.

$$\epsilon = \epsilon_e + \epsilon_r. \tag{1}$$

Let $\sigma(t)$ stand for dynamic stress at time t ($\sigma(t)=0$ for $t \leq 0$). Then $\epsilon_e$ and $\epsilon_r$ read:

$$\epsilon_e(t) = J_0 \sigma(t) \tag{2}$$

and $$\epsilon_r(t) = \int_0^t \sigma(t-s) \frac{dJ}{ds} ds \tag{3}$$

in which $J_0 = J(0) = 1/E$ is the instantaneous creep-compliance representing the immediate response of the material, E is the Young's modulus of elasticity of pipe wall, and $J(t)$ is the creep function.

The discharge and pressure oscillations due to a fluid transient are denoted by q and h, respectively. The linearized unsteady-oscillatory continuity and momentum equations with time t and spatial coordinate $x \in [x^U, x^L) \cup (x^L, x^D]$ are $$\frac{\partial q}{\partial x} + \frac{gA}{a_0^2} \frac{\partial h}{\partial t} + 2(1-v^2)A \frac{\partial \epsilon_r}{\partial t} = 0 \tag{4}$$

and $$\frac{1}{gA} \frac{\partial q}{\partial t} + \frac{\partial h}{\partial x} + Rq = 0, \tag{5}$$

where unsteady friction is neglected and it is reasonable. Here, $$a_0 = \left( \rho \left( \frac{1}{\kappa} + (1-v^2) \frac{D}{Ee} \right) \right)^{-1/2} \tag{6}$$

is the elastic component of wave speed, K and $\rho$ are the bulk modulus and density of the liquid flowing in the pipe 110, v is the Poisson's ratio, D is the internal pipe diameter, and e is the pipe wall thickness. Furthermore, A is the area of pipe 110, R is the steady-state resistance term being $R=(f_{DW} Q_0)/(gDA^2)$ for turbulent flows, $f_{DW}$ is the Darcy-Weisbach friction factor, $Q_0$ is the steady-state discharge in the pipe 110. The last term of left hand side of EQN. (4) is due to pipe wall viscoelasticity; it equals to 0 in the elastic case since the creep function $J(t)$ is time-independent. Furthermore, $\epsilon_r$ here is the retarded circumferential strain and the influence of axial pipe velocity on EQNS. (4) and (5) is neglected.

Inserting EQN. (3) into EQN. (4) gives $$\frac{\partial q}{\partial x} + \frac{gA}{a_0^2} \frac{\partial h}{\partial t} + 2(1-v^2)A \frac{\partial}{\partial t} \int_0^t \sigma(t-s) \frac{dJ}{ds} ds = 0 \tag{7}$$

Consider the force balance for the stress in the pipe wall and the pressure in fluid, viz., $$2\sigma e = pD \tag{8}$$

where $p = \rho g h$ is the dynamic pressure. It follows that $$\sigma(t) = \frac{\rho g D}{2e} h(t). \tag{9}$$

Therefore, EQN. (7) becomes $$\frac{\partial q}{\partial x} + \frac{gA}{a_0^2} \frac{\partial h}{\partial t} + (1-v^2) \frac{\rho g DA}{e} \frac{\partial}{\partial t} \int_0^t h(t-s) \frac{dJ}{ds} ds = 0. \tag{10}$$

Taking a Fourier transform of EQN. (10) gives $$\frac{\partial q}{\partial x} + \frac{gA}{a_0^2} i\omega h + (1-v^2) \frac{\rho g DA}{e} \mathcal{F}\left( \frac{\partial}{\partial t} \int_0^t h(t-s) \frac{dJ}{ds} ds \right) = 0 \tag{11}$$

where $i = \sqrt{-1}$ is an imaginary unit, and $\mathcal{F}(\bullet)$ stands for the operation of Fourier transform. The last term of EQN. (11) can be simplified by the Leibniz's rule for differentiation under the integral sign, properties of Fourier transform and convolution, and the condition that $h(t)=0$ for $t \leq 0$, as:

$$\mathcal{F}\left( \frac{\partial}{\partial t} \int_0^t h(t-s) \frac{dJ}{ds} ds \right) = \mathcal{F}\left( h(0) \frac{dJ}{dt} + \int_0^t \frac{\partial}{\partial t} h(t-s) \frac{dJ}{ds} ds \right) = \tag{12}$$

-continued $$\mathcal{F}\left(\int_0^t \frac{\partial}{\partial t}h(t-s)\frac{dJ}{ds}ds\right) = \mathcal{F}\left(\frac{\partial h}{\partial t}\right)\mathcal{F}\left(\frac{dJ}{dt}\right) = i\omega h \mathcal{F}\left(\frac{dJ}{dt}\right).$$

Here, the creep function J(t) is assumed to follow the generalized K-V model:

$$J(t) = J_0 + \sum_{j=1}^{N} J_j(1 - \exp(-t/\tau_j)) \quad (13)$$

where N is the truncated order, J and $\tau_j$ are coefficients of the K-V model. It follows that $$\frac{dJ}{dt} = \sum_{j=1}^{N} \frac{J_j}{\tau_j}\exp(-t/\tau_j) \quad (14)$$

and $$\mathcal{F}\left(\frac{dJ}{dt}\right) = \sum_{j=1}^{N} \frac{J_j}{1 + i\omega\tau_j}. \quad (15)$$

By EQNS. (12) and (15), EQN. (11) becomes $$\frac{\partial q}{\partial x} + \frac{gA}{a_{ve}^2}i\omega h = 0 \quad (16)$$

where $$a_{ve} = \left(\rho\left(\frac{1}{\kappa} + (1-v^2)\frac{D}{e}\left(J_0 + \sum_{j=1}^{N} \frac{J_j}{1 + i\omega\tau_j}\right)\right)\right)^{-1/2}. \quad (17)$$

Furthermore, taking Fourier transform of EQN. (5) gives $$\frac{\partial h}{\partial x} + \left(\frac{i\omega}{gA} + R\right)q = 0. \quad (18)$$

C. Leakage Location Estimation Scheme by MFP

EQNS. (16) and (18) are respectively the continuity and momentum equations in the frequency domain. In the considered viscoelastic case where the pipe motion is assumed to be purely radial, the momentum equation shown in EQN. (18) is same as the elastic case; the continuity equation changes but it is equivalent to replacing the constant wave speed in the elastic case ($a_0$ in EQN. (6)) by the frequency-dependent a in EQN. (17). It follows that the momentum and continuity equations for the viscoelastic case respectively take similar forms of the ones for the elastic case. Therefore, the theoretical development made in the disclosure of X. WANG and M. S. GHIDAOUI (2018) for the elastic case is applicable to the present viscoelastic case. The disclosure of X. WANG and M. S. GHIDAOUI (2018) is hereby incorporated by reference in its entirety.

Since a in EQN. (17) is frequency-dependent, EQN. (17) is rewritten as $$a_{ve}(\omega) = \left(\rho\left(\frac{1}{\kappa} + (1-v^2)\frac{D}{e}\left(J_0 + \sum_{j=1}^{N} \frac{J_j}{1 + i\omega\tau_j}\right)\right)\right)^{-1/2}. \quad (19)$$

In EQN. (19), $a_{ve}(\omega)$ denotes a frequency-dependent wave speed of the transient wave 131 traveling in the pipe 110, and N, $J_j$ and $\tau_j$ for j=1, ..., N collectively are viscoelastic coefficients in a generalized K-V model. Based on the expression of $a_{ve}(\omega)$ given by EQN. (19), and based on the theoretical development in the disclosure of X. WANG and M. S. GHIDAOUI (2018), the algorithm for estimating the leakage location $x^L$ of the leak 123 can be derived, and is provided as follows.

The estimation of $x^L$ is based on measurement data obtained from the sensors 141-0:M. By using these sensors, one obtains time-domain signals of liquid pressure measured at the locations $x_0, x_1, \ldots, x_M$ of the pipe 110. Denote $h(x_m, t)$ as the time-domain signal of liquid pressure measured at $x_m$, and $h(x_m, \omega)$ as a FRF of liquid pressure measured at $x_m$. The FRF $h(x_m, \omega)$ is a frequency-domain output when an impulse wave is used as the transient wave 131, whereas the time-domain signal $h(x_m, t)$ is a response to the transient wave 131 being a step wave. Hence, $h(x_m, \omega)$ cannot be directly obtained from taking a Fourier transform of $h(x_m, t)$, but may be obtained by the following approach.

Computing $h(x_m, \omega)$ requires both the time-domain output $h(x_m, t)$ and an input signal corresponding to the transient wave 131, which is a step wave. The latter is computed by selecting only the first step rise (from the last steady-state point to the maximum of the first jump) of the transient wave 131 and keeping it constant after the maximum point, since the input signal is generated by the full closure of valve 130. Note that a step time-series signal has infinite energy in theory such that its spectrum cannot be produced by a conventional Fourier transform. In order to change the signal into a finite energy form, the step signal is modified to a pulse-type signal by computing a difference between the original signal and its delayed replica. The delay of the input signal is computed by delaying the original signal with a time lag being equal to the time from the last steady-state point to the maximum of the first jump. According to the additive and distributive nature of a time-invariant linear system, the frequency response of the system remains unchanged as a result of this operation. Then, conventional Fourier transform is applied to the impulse-type output and input signals, giving the corresponding frequency-domain signals. Finally, $h(x_m, \omega)$ is obtained by their quotient. In short, $h(x_m, \omega)$ is computed by $$h(x_m, \omega) = \frac{\mathcal{F}(h(x_m, t) - h(x_m, t - \Delta t))}{\mathcal{F}(v(x_m, t) - v(x_m, t - \Delta t))} \quad (20)$$

where: $\Delta t$ is the time lag as determined above; and $v(x_m, t)$ is a time-domain input signal. If the aforesaid last steady-state point in the first step rise of the transient wave 131 occurs at time t=t', then $v(x_m, t)$ is given by $v(x_m, t)=h(x_m, t)$ for $t \leq t'+\Delta t$ and $v(x_m, t)=h(x_m, t'+\Delta t)$ for $t > t'+\Delta t$.

With the FRF $h(x_0, \omega)$ obtained at $x_0$, the transient discharge at the upstream node 121 can be estimated for different values of $\omega$. Denote $\hat{q}(x^U, \omega)$ as a FRF of the transient discharge at $x^U$. The FRF $\hat{q}(x^U, \omega)$ is given by $$\hat{q}(x^U, \omega) = \frac{-h(x_0, \omega)}{Z(\omega) \times \sinh(\mu(\omega) \times (x_0 - x^U))} \quad (21)$$

where

-continued $$Z(\omega) = \frac{\mu(\omega) \times a_{ve}(\omega)}{igA\omega R} \quad (22)$$

is a characteristic impedance, and $$\mu(\omega) = \frac{1}{a_{ve}(\omega)}\sqrt{-\omega^2 + igA\omega R} \quad (23)$$

is a propagation function. Based on $\hat{q}(x^U, \omega)$ and $a_{ve}(\omega)$, estimate $h^{NL}(x_m, \omega)$, a FRF of liquid pressure measured at $x_m$ under a hypothetical condition of no leakage, for $m=0, \ldots, M$, by $$h^{NL}(x_m,\omega) = -Z(\omega) \times \sin h(\mu(\omega) \cdot x_m) \times \hat{q}(x^U, \omega). \quad (24)$$

The MFP method is then applied to a head difference $\overrightarrow{\Delta h}$ to estimate $x^L$ where $$\overrightarrow{\Delta h} = (h(x_m,\omega_k) - h^{NL}(x_m,\omega_k))_{m=1,\ldots,M;k=1,\ldots,K} \quad (25)$$

is a MK-dimensional column vector. In EQN. (25), $\omega_1$, $\omega_2, \ldots, \omega_K$ are selected and form a plurality of K frequencies. Without loss of generality, consider that $\omega_K$ is greatest in the plurality of K frequencies. The maximum frequency $\omega_K$ is selected to be not greater than a maximum probing frequency. The maximum probing frequency can be approximately computed as $2\pi/T_c$ where $T_c$ is a closing duration, which is a time duration of closing the valve 130 for producing the transient wave 131. In one approach, $x^L$ is estimated from $\overrightarrow{\Delta h}$ by plotting an objective function $$O(x^L) = \frac{\overrightarrow{\Delta h}^H \overrightarrow{G}(x^L) \overrightarrow{G}(x^L)^H \overrightarrow{\Delta h}}{\overrightarrow{G}(x^L)^H \overrightarrow{G}(x^L)} \quad (26)$$

with respect to $x^L$ and identifying a particular value of $x^L$ corresponding to maximum $O(x^L)$ as the estimate of the leakage location. In EQN. (26), $(\bullet)^H$ denotes complex conjugate transpose, and $\overrightarrow{G}(x^L)$ is an MK-dimensional column vector given by $$\overrightarrow{G}(x^L) = (G(x^L;x_m,\omega_k))_{m=1,2,\ldots,M;k=1,\ldots,K} \quad (27)$$

with $$G(x^L;x_m,\omega_k) = \quad (28)$$
$$\begin{cases} -\dfrac{\sqrt{g} \times Z^2(\omega_k)}{\sqrt{2(H_0^L - z^L)}} \sinh(\mu(\omega_k) \times (x_m - x^L))\sinh(\mu(\omega_k) \times x^L)\hat{q}(x^U, \omega), & x_m > x^L \\ 0, & x_m \le x^L \end{cases}$$

in which $H_0^L$ is a pressure at $x^L$, and $z^L$ is an elevation of the pipe at $x^L$. In another approach, $x^L$ is estimated from $\overrightarrow{\Delta h}$ by directly computing $$\hat{x}^L = \underset{x^U < x^L < x^D}{\operatorname{argmax}} (O(x^L)) \quad (29)$$

where $\hat{x}^L$ is an estimate of $x^L$.

D. Disclosed method and system

Based on the leakage-location estimation scheme disclosed above, embodiments of the disclosed method and system are developed as follows. Although the disclosed method and system are particularly useful to the case that the pipe 110 carries water as in a municipal water-supply system, the estimation of the leakage location $x^L$ as provided by the disclosed method and system is also applicable to other types of liquid.

Figure 2:
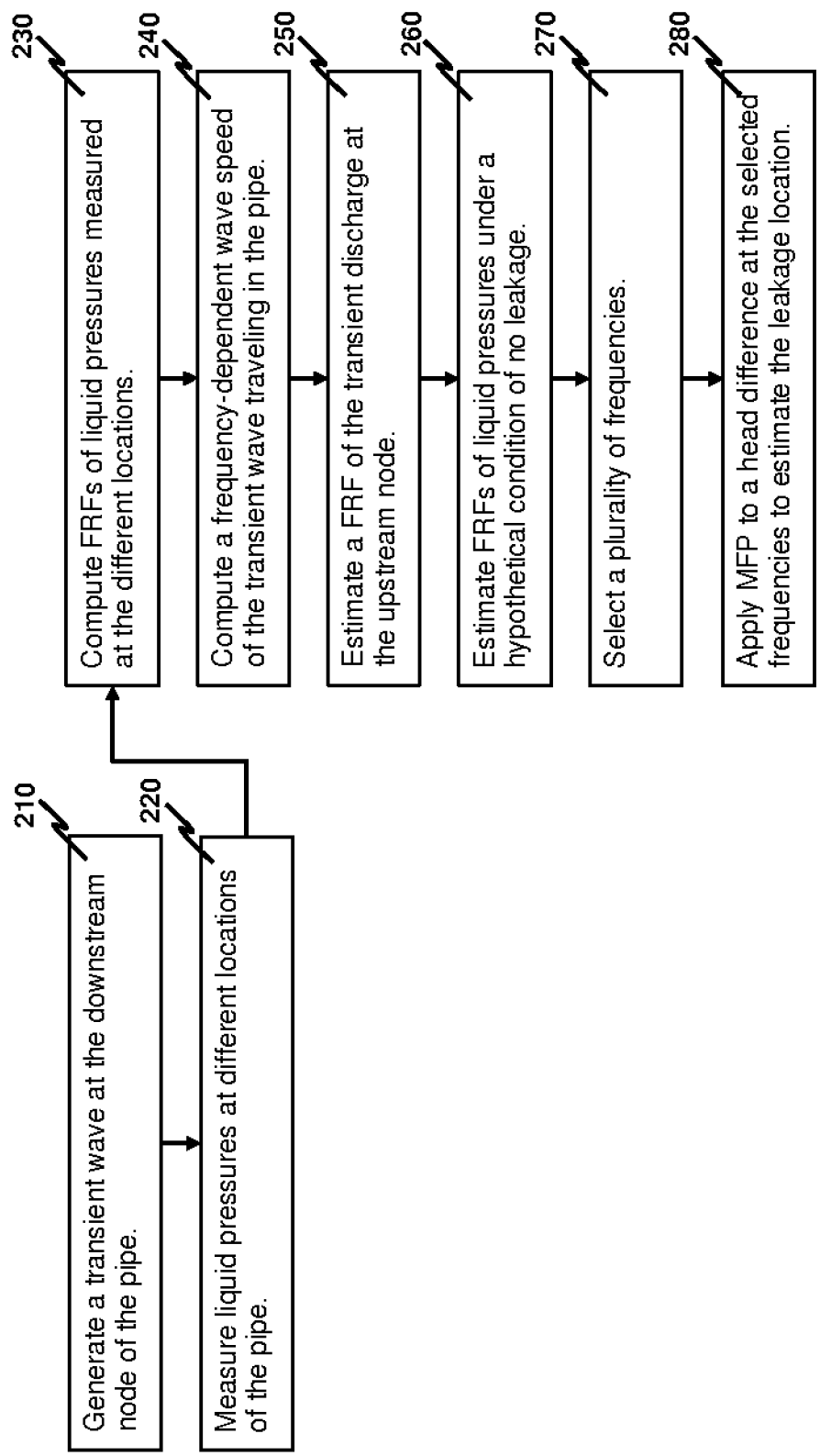
FIG. 2 depicts a flowchart showing exemplary steps of a first method as disclosed herein for estimating a leakage location in a pipe.

A first aspect of the present disclosure is to provide a first method for estimating a leakage location $x^L$ of a viscoelastic pipe. The pipe has an upstream node and a downstream node respectively located at $x^U$ and $x^D$ of the pipe for allowing a liquid to flow along the pipe from $x^U$ to $x^D$. Furthermore, the pipe maintains a constant pressure at $x^U$. As mentioned above, maintaining a constant pressure at $x^U$ is achievable by, for instance, connecting the upstream node to a reservoir, a tank or a centrifugal pump. The disclosed first method is exemplarily illustrated as follows with the aid of FIG. 2, which depicts a flowchart showing exemplary steps of the first method.

In a step 210, a transient wave is generated at $x^D$. The transient wave then propagates back and forth along the pipe between $x^D$ and $x^U$, and produces at least a transient discharge at $x^U$. In one embodiment, the transient wave is a step wave generated by closing the downstream node for a predetermined closing duration. The downstream node may be closed by closing a valve (e.g., the valve 130) installed at the downstream node.

In a step 220, liquid pressures at locations $x_0, x_1, \ldots, x_M$ of the pipe are measured at least during propagation of the transient wave along the pipe. That is, the liquid-pressure measurement is initiated no later than the starting moment of generating the transient wave at $x^D$ in the step 210. In particular, $x_0$ is nearest to $x^U$ among the M+1 locations. Furthermore, the location $x_0$ is chosen to be close to $x^U$ in that the liquid pressure measured at $x_0$ is used for measuring the transient discharge at $x^U$. Although the remaining locations $x_1, \ldots, x_M$ are preferred to be substantially-evenly distributed along the pipe for more accurately estimating $x^L$, accessibility to inside the pipe may restrict an engineer to choose the locations $x_1, \ldots, x_M$ to be close to $x^D$. Pressure sensors, such as hydrophones, are installed at the M+1 locations for the measurement. As a result, the measurement yields time-domain signals $h(x_m, t)$, $m=0, \ldots, M$. In practical implementation of the step 220, M is at least two. A higher value of M generally gives a higher accuracy in estimating $x^L$ at the expense of a higher implementation cost.

The FRF $h(x_m, \omega)$ is then computed from $h(x_m, t)$ by a Fourier transform for $m \in \{0, \ldots, M\}$ in a step 230. Note that since $h(x_m, t)$ is obtained by measurement and received by a computing device in practice, $h(x_m, t)$ is a sampled signal having values at discrete values of t. Hence, $h(x_m, \omega)$ is often computed from $h(x_m, t)$ by involving a discrete Fourier transform or a fast Fourier transform in computing EQN. (20). In practice, $h(x_m, \omega)$ is often computed as a frequency-domain sampled signal at a first plurality of discrete values of $\omega$.

In a step 240, $a_{ve}(\omega)$ is computed according to geometrical dimensions and viscoelastic coefficients of the pipe by EQN. (19). In a step 250, $\hat{q}(x^U, \omega)$ is computed according to $h(x_0, \omega)$ and $a_{ve}(\omega)$ by EQN. (21). In a step 260, $h^{NL}(x_m, \omega)$ is estimated for $m=0, \ldots, M$ according to $\hat{q}(x^U, \omega)$ and $a_{ve}(\omega)$ by EQN. (24). Similarly, $a_{ve}(\omega)$, $\hat{q}(x^U, \omega)$ and $h^{NL}(x_m, \omega)$ are often computed as frequency-domain sampled signals at the aforesaid first plurality of discrete $\omega$ values.

A second plurality of frequencies $\omega_1, \omega_2, \ldots, \omega_K$ is selected in a step 270. In a step 280, MFP is applied to a head difference $\vec{\Delta h}$, which is computed by EQN. (25) according to the second plurality of frequencies, to estimate $x^L$.

Assume that $\omega_1$ and $\omega_K$ are the lowest and highest frequencies, respectively, in the second plurality of frequencies. As mentioned above, $\omega_K$ is selected to be less than the maximum probing frequency. All available frequencies lower than the maximum probing frequency can be used as $\omega_K$, not just resonant frequencies of the pipe or of a pipeline system under consideration. In one embodiment, $\omega_K$ is selected to be less than $2\pi/T_c$, wherein $T_c$ is the predetermined closing duration in closing the downstream node. Although $\omega_1, \omega_2, \ldots, \omega_{K-1}$ can be individually and arbitrarily selected, these K 1 frequencies are often conveniently selected such that each of $\omega_2, \ldots, \omega_K$ is a multiple of $\omega_1$. For instance, $\omega_k$, $k \in \{1, 2, \ldots, K\}$, is selected to be $\omega_k = k\omega_1 = (k/K)\omega_K$. Since the selection of the second plurality of frequencies is optimized for carrying out MFP, it is not necessary that the first plurality of frequencies is selected to be the second plurality of frequencies in computing $h(x_m, \omega)$, $a_{ve}(\omega)$, $\hat{q}(x^U, \omega)$ and $h^{NL}(x_m, \omega)$. Nevertheless, selecting the first plurality of frequencies to be the second plurality of frequencies simplifies implementation of the disclosed first method. It is preferable to compute $h(x_m, \omega)$, $a_{ve}(\omega)$, $\hat{q}(x^U, \omega)$ and $h^{NL}(x_m, \omega)$ at $\omega = \omega_1, \omega_2, \ldots, \omega_K$.

In one embodiment, the step 280 comprises plotting an objective function $O(x^L)$ given by EQN. (26) on a graph with respect to $x^L$, thereby allowing a person or a user to identify a particular value of $x^L$ corresponding to maximum $O(x^L)$ on the graph as an estimate of $x^L$. In an alternative embodiment, $x^L$ is estimated from $\vec{\Delta h}$ in the step 270 by computing EQN. (29). The estimation of $x^L$ from $\vec{\Delta h}$ or from $h(x_m, t)$, $m=0, 1, \ldots, M$, can be automatically accomplished by a computing device. In yet another embodiment, the step 280 comprises computing EQN. (29) to estimate $x^L$ and plotting $O(x^L)$ given by EQN. (26) on the graph with respect to $x^L$. This embodiment has an advantage that while the estimate of $x^L$ can be automatically computed, a person of skill can verify if the estimate is valid or not abnormal by examining a plot of $O(x^L)$ against different values of $x^L$.

Figure 3:
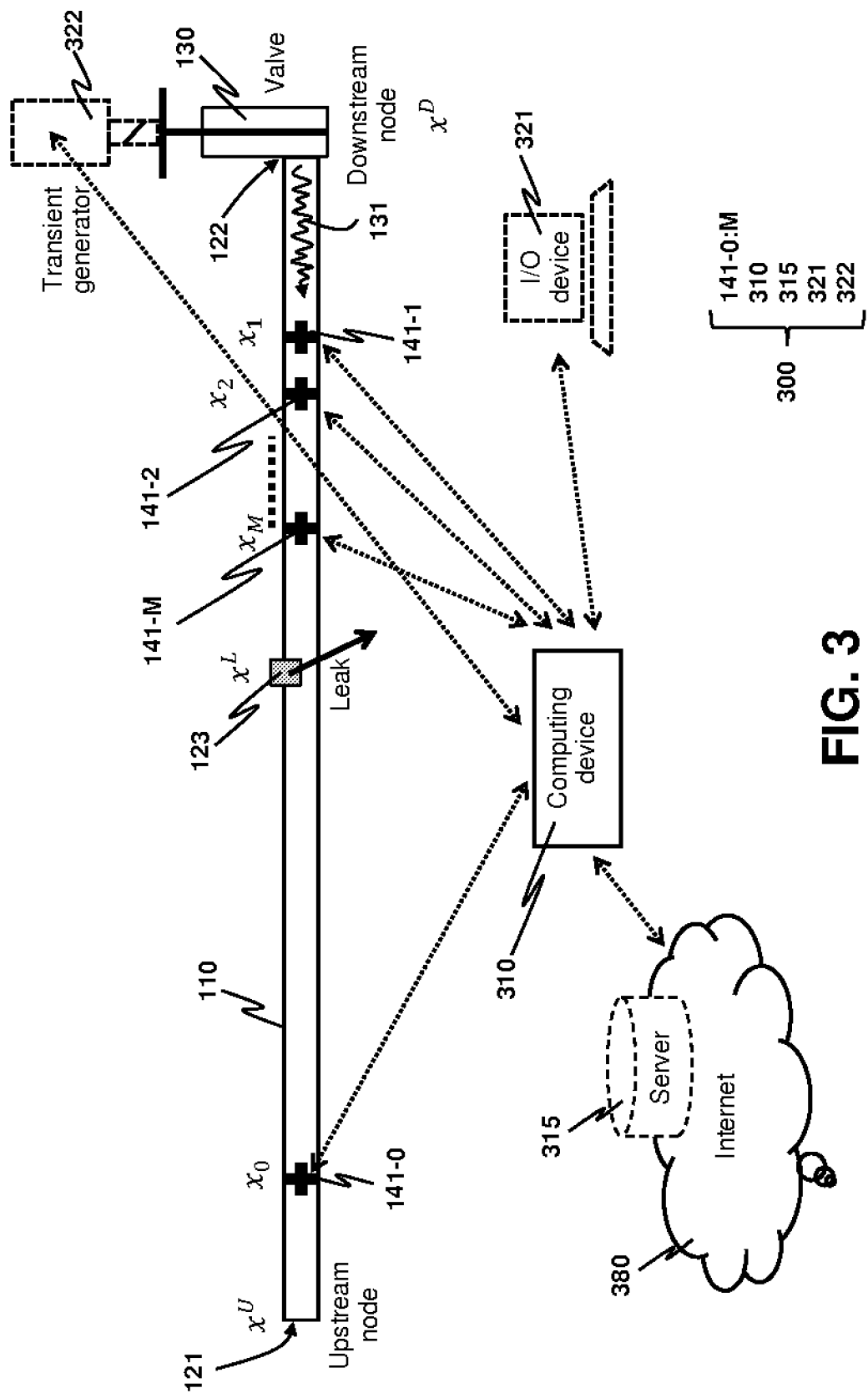
FIG. 3 depicts an exemplary system for estimating a leakage location of the pipe in accordance with the present disclosure.

A second aspect of the present disclosure is to provide a system for estimating the leakage location $x^L$ of the viscoelastic pipe 110. The disclosed system is a counterpart of the first method disclosed above, and is illustrated with the aid of FIG. 3. On top of the pipeline system model shown in FIG. 1, FIG. 3 depicts an exemplary system 300 for estimating $x^L$ of the leak 123 on the pipe 110.

The system 300 comprises the M+1 sensors 141-0:M arranged to be distributed on the locations $x_0, x_1, \ldots, x_M$ of the pipe 110 for measuring liquid pressures at the M+1 locations. As mentioned above, M is at least two and $x_0$ is nearest to $x^U$ among the M+1 locations. In one practical implementation, each of the M+1 sensors 141-0:M is a hydrophone.

Figure 4:
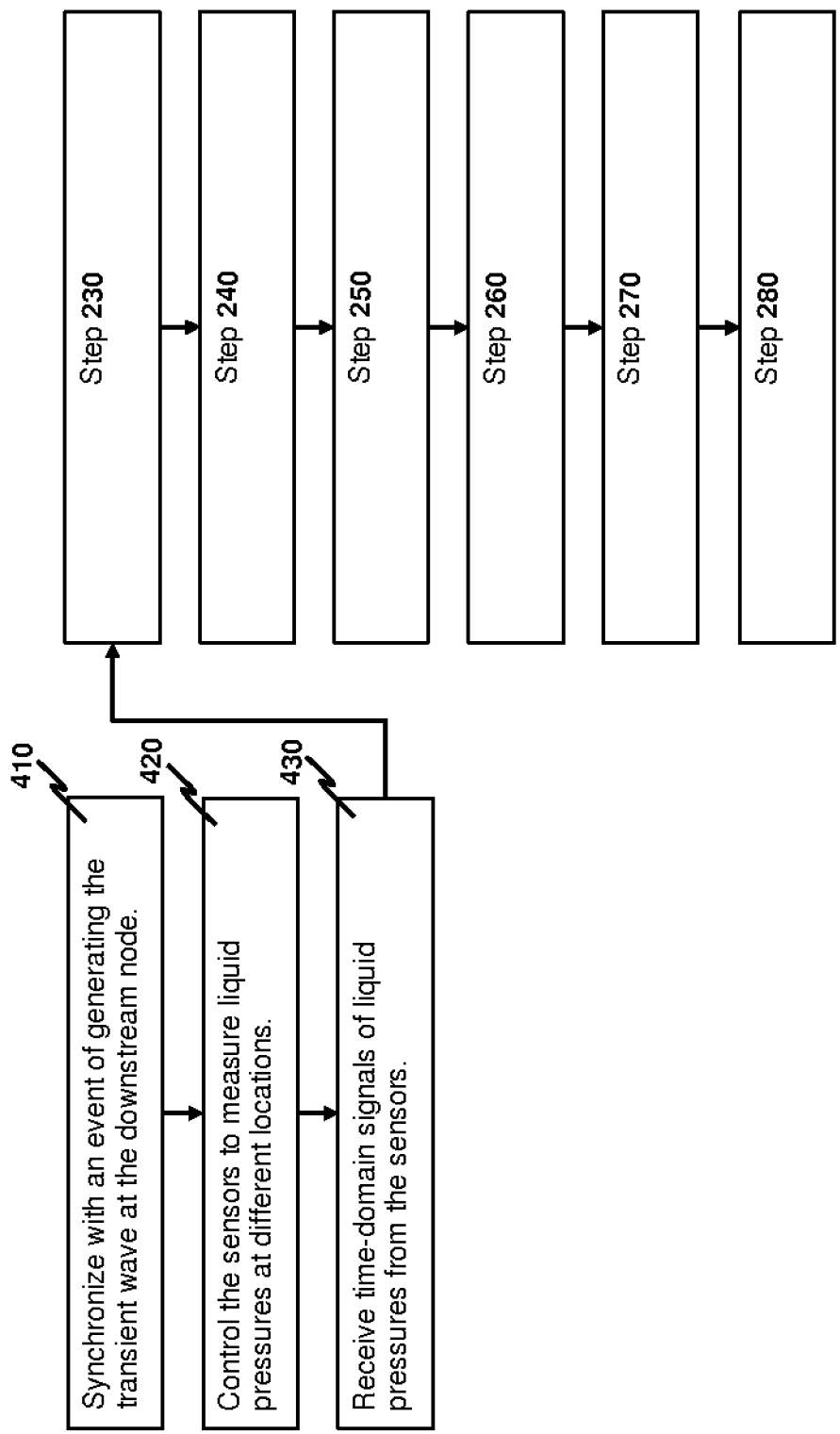
FIG. 4 illustrates exemplary steps carried out in a computing process executed by a computing device in the system of FIG. 3 for estimating the leakage location.

The system 300 further comprises a computing device 310 for controlling the sensors 141-0:M and for performing data processing to estimate $x^L$. The computing device 310 is capable of communicating with the M+1 sensors 141-0:M wirelessly or through wires, and is configured to execute a computing process for controlling the sensors 141-0:M and estimating $x^L$. FIG. 4 depicts exemplary steps carried out in the computing process.

In a step 410, the computing device 310 synchronizes itself with an event of generating the transient wave 131 at $x^D$. The event causes the transient wave 131 to propagate back and forth along the pipe 110 between $x^D$ and $x^U$ and to produce at least a transient discharge at $x^U$.

In one case, the transient wave 131 is produced by a user manually actuating the valve 130 to close the downstream node 122 for the predetermined closing duration. Synchronization between the computing device 310 and the user's action is achievable if the system 300 further includes an I/O device 321 as a user interface for interacting with the user, where the I/O device 321 is communicable, via wires or wirelessly, with the computing device 321. Synchronization is often accomplished by either the computing device 310 requesting the user to close the downstream node 122, or the user notifying the computing device 310 that the user is about to generate the transient wave 131. As such, the step 410 of the computing process comprises: configuring the I/O device 321 to notify the user to generate the transient wave 131 at $x^D$; or configuring the I/O device 321 to receive a message from the user that the transient wave 131 is about to be generated.

In another case, a transient generator 322 is used for generating the transient wave 131. Usually, the transient generator 322 is an actuator detachably installable at the valve 130 for driving the valve 130 to open and close. Although the transient generator 322 may or may not be a member of the system 300, it is required that the transient generator 322 is controllable by the computing device 310. In the computing process, the step 410 comprises controlling the transient generator 322 to close the downstream node 122 for the predetermined closing duration so as to generate the transient wave 131.

After synchronization with the transient-wave generating event is established, the computing device 310 controls the sensors 141-0:M to measure the liquid pressures at the M+1 locations in a step 420. In particular, the measurement is carried out at least during propagation of the transient wave 131 along the pipe 110. Consequently, the measurement yields the time-domain signals $h(x_m, t)$, $m=0, \ldots, M$. In a step 430, the computing device 310 receives the $h(x_m, t)$, $m=0, \ldots, M$, from the sensors 141-0:M After the $h(x_m, t)$, $m=0, \ldots, M$, are received, the computing device 310 executes the steps 230, 240, 250, 260, 270 and 280, which are elaborated above.

In practical implementation, the computing device 310 may be a desktop computer, a notebook computer, a tablet, a smartphone, or any other computing device or mobile computing device as deemed appropriate by those skilled in the art. Although the system 300 is illustrated with a single computing device (namely, the computing device 310) performing the aforementioned computing process, those skilled in the art will appreciate that multiple computing devices or multiple computers networked together may be collectively used to perform the computing process.

Since examination of pipe leakage is likely to be an outdoor task to the user, a mobile computing device, which is power-limited, is a preferable choice of the computing device 310. The system 300 may further comprise a server 315 connectable to the computing device 310 through the Internet 380 such that computationally intensive tasks of data processing are offloaded from the computing device 310 to the server 315 to perform while the computing device 310 performs various control and communication tasks such as the steps 410, 420 and 430.

Figure 5:
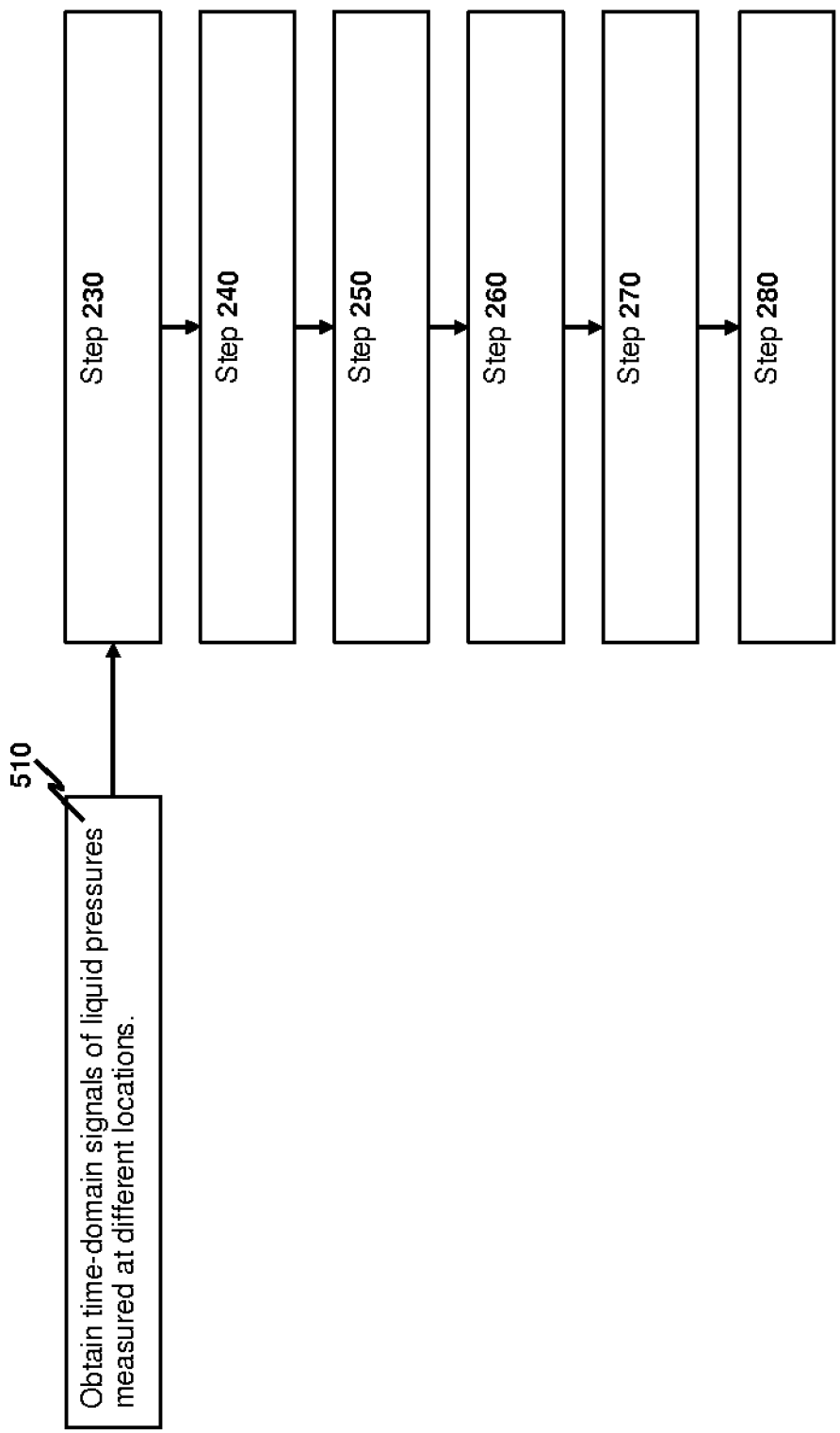
FIG. 5 depicts a flowchart showing exemplary steps of a second method, which is a computer-implemented method, as disclosed herein.

A third aspect of the present disclosure is to provide a second method for estimating the leakage location $x^L$ for the viscoelastic pipe 110 from measurement data obtained from the sensors 141-0:M. The disclosed second method, which is concerned with data processing only, is implemented by one or more computers, such as the server 315. FIG. 5 depicts a flowchart showing exemplary steps of the disclosed second method.

In a step 510, M+1 time-domain signals of liquid pressures respectively measured at the locations $x_0, x_1, \ldots, x_M$ of the pipe 110, namely, $h(x_m, t)$, $m=0, 1, \ldots, M$, are obtained. As mentioned above, the liquid pressures are measured at least during propagation of the transient wave 131 along the pipe 110; the transient wave 131 propagates back and forth along the pipe 110 between the downstream node 122 and the upstream node 121, and produces at least a transient discharge at the upstream node 121; M is at least two; and $x_0$ is nearest to the upstream node 121 among the M+1 locations.

After the $h(x_m, t)$, $m=0, \ldots, M$, are obtained, the steps 230, 240, 250, 260, 270 and 280 are executed. These steps are elaborated above.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for estimating a leakage location $x^L$ of a viscoelastic pipe, the pipe having an upstream node and a downstream node respectively located at $x^U$ and $x^D$ of the pipe for allowing a liquid to flow along the pipe from $x^U$ to $x^D$, the pipe having a constant pressure at $x^U$, the method comprising:

generating a transient wave at $x^D$, whereby the transient wave propagates back and forth along the pipe between $x^D$ and $x^U$, and produces at least a transient discharge at $x^U$;

measuring liquid pressures at locations $x_0, x_1, \ldots, x_M$ of the pipe at least during propagation of the transient wave along the pipe to thereby yield $h(x_m, t)$, $m=0, \ldots, M$, where $h(x_m, t)$ is a time-domain signal of liquid pressure measured at $x_m$, wherein M is at least two and $x_0$ is nearest to $x^U$ among the M+1 locations;

computing $h(x_m, \omega)$, a frequency response function (FRF) of liquid pressure measured at $x_m$, according to $h(x_m, t)$ for $m=0, \ldots, M$;

computing a frequency-dependent wave speed $a_{ve}(\omega)$ of the transient wave traveling in the pipe according to geometrical dimensions and viscoelastic coefficients of the pipe;

estimating $\hat{q}(x^U, \omega)$, a FRF of the transient discharge at $x^U$, according to $h(x_0, \omega)$ and $a_{ve}(\omega)$;

estimating $h^{NL}(x_m, \omega)$, a FRF of liquid pressure measured at $x_m$ under a hypothetical condition of no leakage, for $m=0, \ldots, M$ according to $\hat{q}(x^U, \omega)$ and $a_{ve}(\omega)$;

selecting a plurality of K frequencies $\omega_1, \omega_2, \ldots, \omega_K$; and applying matched-field processing (MFP) to a head difference $\vec{\Delta h}$ to estimate $x^L$ where $\vec{\Delta h}$ is a MK-dimensional column vector given by $$\vec{\Delta h} = (h(x_m, \omega_k) - h^{NL}(x_m, \omega_k))_{m=1,\ldots,M; k=1,\ldots,K}.$$

2. The method of claim 1, wherein $a_{ve}(\omega)$ is computed by $$a_{ve}(\omega) = \left(\rho\left(\frac{1}{K} + (1-v^2)\frac{D}{e}\left(J_0 + \sum_{j=1}^{N}\frac{J_j}{1+i\omega\tau_j}\right)\right)\right)^{-1/2}$$

where $i=\sqrt{-1}$ is an imaginary unit, K is a bulk modulus of the liquid, $\rho$ is a density of the liquid, $v$ is a Poisson's ratio, D is an internal diameter of the pipe, e is a wall thickness of the pipe, and N, $J_j$ and $\tau_j$ for $j=1, \ldots, N$ are viscoelastic coefficients in a generalized Kelvin-Voigt (K-V) model.

3. The method of claim 2, wherein $\hat{q}(x^U, \omega)$ and $h^{NL}(x_m, \omega)$ are estimated by $$\hat{q}(x^U, \omega) = \frac{-h(x_0, \omega)}{Z(\omega) \times \sinh(\mu(\omega) \times (x_0 - x^U))}$$

and $$h^{NL}(x_m, \omega) = -Z(\omega) \times \sinh(\mu(\omega) \cdot x_m) \times \hat{q}(x^U, \omega)$$

where:

$Z(\omega)$ is a characteristic impedance given by $$Z(\omega) = \frac{\mu(\omega) \times a_{ve}(\omega)}{igA\omega R};$$

$\mu(\omega)$ is given by $$\mu(\omega) = \frac{1}{a_{ve}(\omega)}\sqrt{-\omega^2 + igA\omega R};$$

$g=9.81$ ms$^{-2}$ is the gravitational constant;

A is an area of the pipe area; and

R is a steady-state resistance of the pipe.

4. The method of claim 3, wherein the applying of MFP to $\vec{\Delta h}$ to estimate $x^L$ comprises:

plotting an objective function $$O(x^L) = \frac{\vec{\Delta h}^H \vec{G}(x^L)\vec{G}(x^L)^H \vec{\Delta h}}{\vec{G}(x^L)^H \vec{G}(x^L)}$$

on a graph with respect to $x^L$ to thereby allow a person to identify a particular value of $x^L$ corresponding to maximum $O(x^L)$ on the graph as an estimate of $x^L$, where:

$(\bullet)^H$ denotes complex conjugate transpose; and $\vec{G}(x^L)$ is an MK-dimensional column vector given by $$\vec{G}(x^L) = (G(x^L; x_m, \omega_k))_{m=1,2,\ldots,M; k=1,\ldots,K}$$

with $$G(x^L; x_m, \omega_k) = \begin{cases} -\dfrac{\sqrt{g} \times Z^2(\omega_k)}{\sqrt{2(H_0^L - z^L)}} \sinh(\mu(\omega_k) \times (x_m - x^L)) & x_m > x^L \\ \sinh(\mu(\omega_k) \times x^L) \hat{q}(x^U, \omega), & \\ 0, & x_m \le x^L \end{cases}$$

in which $H_0^L$ is a pressure at $x^L$, and $z^L$ denotes an elevation of the pipe at $x^L$.

5. The method of claim 3, wherein $x^L$ is estimated from $\vec{\Delta h}$ by $$\hat{x}^L = \underset{x^U < x^L < x^D}{\operatorname{argmax}} \left( \dfrac{\vec{\Delta h}^H \vec{G}(x^L) \vec{G}(x^L)^H \vec{\Delta h}}{\vec{G}(x^L)^H \vec{G}(x^L)} \right)$$

where:

$\hat{x}^L$ is an estimate of $x^L$;

$(\bullet)^H$ denotes complex conjugate transpose; and $\vec{G}(x^L)$ is an MK-dimensional column vector given by $$\vec{G}(x^L) = (G(x^L; x_m, \omega_k))_{m=1,2,\ldots,M; k=1,\ldots,K}$$

with $$G(x^L; x_m, \omega_k) = \begin{cases} -\dfrac{\sqrt{g} \times Z^2(\omega_k)}{\sqrt{2(H_0^L - z^L)}} \sinh(\mu(\omega_k) \times (x_m - x^L)) & x_m > x^L \\ \sinh(\mu(\omega_k) \times x^L) \hat{q}(x^U, \omega), & \\ 0, & x_m \le x^L \end{cases}$$

in which $H_0^L$ is a pressure at $x^L$, and $z^L$ denotes an elevation of the pipe at $x^L$.

6. The method of claim 1, wherein the transient wave is a step wave generated by closing the downstream node for a predetermined closing duration.

7. The method of claim 6, wherein $\omega_K$ is highest in the plurality of K frequencies and is selected to be less than $2\pi/T_c$, where $T_c$ is the predetermined closing duration.

8. The method of claim 1, wherein $h(x_m, \omega)$, $a_{ve}(\omega)$, $\hat{q}(x^U, \omega)$ and $h^{NL}(x_m, \omega)$ are computed or estimated at $\omega = \omega_1, \omega_2, \ldots, \omega_K$.

9. The method of claim 8, wherein values of $h(x_m, \omega)$ at $\omega = \omega_1, \omega_2, \ldots, \omega_K$ are computed by $$h(x_m, \omega) = \dfrac{\mathcal{F}(h(x_m, t) - h(x_m, t - \Delta t))}{\mathcal{F}(v(x_m, t) - v(x_m, t - \Delta t))}$$

where $\mathcal{F}(\bullet)$ denotes taking a Fourier transform, $\Delta t$ is a predetermined time lag, and $v(x_m, t)$ is a time-domain input signal.

10. The method of claim 1, wherein the plurality of K frequencies is selected such that $\omega_1$ is a lowest frequency in the plurality of K frequencies and each of $\omega_2, \ldots, \omega_K$ is a multiple of $\omega_1$.

11. The method of claim 1, wherein M=2.

12. A system for estimating a leakage location $x^L$ of a viscoelastic pipe, the pipe having an upstream node and a downstream node respectively located at $x^U$ and $x^D$ of the pipe for allowing a liquid to flow along the pipe from $x^U$ to $x^D$, the pipe having a constant pressure at $x^U$, the system comprising:

plural sensors arranged to be distributed on locations $x_0$, $x_1, \ldots, x_M$ of the pipe for measuring liquid pressures at the M+1 locations, M being at least two and $x_0$ being nearest to $x^U$ among the M+1 locations; and one or more computing devices configured to control the sensors and to execute a process comprising:

synchronizing with an event of generating a transient wave at $x^D$, the event causing the transient wave to propagate back and forth along the pipe between $x^D$ and $x^U$ and to produce at least a transient discharge at $x^U$;

controlling the sensors to measure the liquid pressures at the M+1 locations at least during propagation of the transient wave along the pipe;

receiving $h(x_m, t)$, m=0, ..., M, from the sensors where $h(x_m, t)$ is a time-domain signal of liquid pressure measured at $x_m$;

computing $h(x_m, \omega)$, a frequency response function (FRF) of liquid pressure measured at $x_m$, according to $h(x_m, t)$ for m=0, ..., M;

computing a frequency-dependent wave speed $a_{ve}(\omega)$ of the transient wave traveling in the pipe according to geometrical dimensions and viscoelastic coefficients of the pipe;

estimating $\hat{q}(x^U, \omega)$, a FRF of the transient discharge at $x^U$, according to $h(x_0, \omega)$ and $a_{ve}(\omega)$;

estimating $h^{NL}(x_m, \omega)$, a FRF of liquid pressure measured at $x_m$ under a hypothetical condition of no leakage, for m=0, ..., M according to $\hat{q}(x^U, \omega)$ and $a_{ve}(\omega)$;

selecting a plurality of K frequencies $\omega_1, \omega_2, \ldots, \omega_K$; and applying matched-field processing (MFP) to a head difference $\vec{\Delta h}$ to estimate $x^L$ where $\vec{\Delta h}$ is a MK-dimensional column vector given by $$\vec{\Delta h} = (h(x_m, \omega_k) - h^{NL}(x_m, \omega_k))_{m=1,\ldots,M; k=1,\ldots,K}.$$

13. The system of claim 12 further comprising an input/output (I/O) device used for communicating with a user, the I/O device being communicable with the one or more computing devices, wherein the synchronizing of the transient-wave generating event comprises:

configuring the I/O device to notify the user to generate the transient wave at $x^D$; or configuring the I/O device to receive a message from the user that the transient wave is about to be generated.

14. The system of claim 12, wherein:

the one or more computing devices are configured to control a transient generator used for generating the transient wave; and the synchronizing of the transient-wave generating event comprises controlling the transient generator to close the downstream node for a predetermined closing duration so as to generate the transient wave.

15. A computer-implemented method for estimating a leakage location $x^L$ of a viscoelastic pipe, the pipe having an upstream node and a downstream node respectively located at $x^U$ and $x^D$ of the pipe for allowing a liquid to flow along the pipe from $x^U$ to $x^D$, the pipe having a constant pressure at $x^U$, the method comprising:

obtaining M+1 time-domain signals of liquid pressures respectively measured at locations $x_0, x_1, \ldots, x_M$ of the pipe, the liquid pressures being measured at least during propagation of a transient wave along the pipe, the transient wave propagating back and forth along the pipe between $x^D$ and $x^U$ and at least producing a transient discharge at $x^U$, M being at least two, $x_0$ being nearest to $x^U$ among the M+1 locations;

computing $h(x_m, \omega)$, a frequency response function (FRF) of liquid pressure measured at $x_m$, according to $h(x_m, t)$ for $m=0, \ldots, M$, where $h(x_m, t)$ is a respective time-domain signal of liquid pressure measured at $x_m$;

computing a frequency-dependent wave speed $a_{ve}(\omega)$ of the transient wave traveling in the pipe according to geometrical dimensions and viscoelastic coefficients of the pipe;

estimating $\hat{q}(x^U, \omega)$, a FRF of the transient discharge at $x^U$, according to $h(x_0, \omega)$ and $a_{ve}(\omega)$;

estimating $h^{NL}(x_m, \omega)$, a FRF of liquid pressure measured at $x_m$ under a hypothetical condition of no leakage, for $m=0, \ldots, M$ according to $\hat{q}(x^U, \omega)$ and $a_{ve}(\omega)$;

selecting a plurality of K frequencies $\omega_1, \omega_2, \ldots, \omega_K$; and applying matched-field processing (MFP) to a head difference $\vec{\Delta h}$ to estimate $x^L$ where $\vec{\Delta h}$ is a MK-dimensional column vector given by $$\vec{\Delta h} = (h(x_m,\omega_k) - h^{NL}(x_m,\omega_k))_{m=1,\ldots,M;k=1,\ldots,K}.$$

16. The method of claim 15, wherein $a_{ve}(\omega)$ is computed by $$a_{ve}(\omega) = \left( \rho \left( \frac{1}{\kappa} + (1-v^2) \frac{D}{e} \left( J_0 + \sum_{j=1}^{N} \frac{J_j}{1+i\omega\tau_j} \right) \right) \right)^{-1/2}$$

where $i=\sqrt{-1}$ is an imaginary unit, K is a bulk modulus of the liquid, $\rho$ is a density of the liquid, v is a Poisson's ratio, D is an internal diameter of the pipe, e is a wall thickness of the pipe, and N, $J_j$ and $\tau_j$ for $j=1, \ldots, N$ are viscoelastic coefficients in a generalized Kelvin-Voigt (K-V) model.

17. The method of claim 16, wherein $\hat{q}(x^U, \omega)$ and $h^{NL}(x_m, \omega)$ are estimated by $$\hat{q}(x^U, \omega) = \frac{-h(x_0, \omega)}{Z(\omega) \times \sinh(\mu(\omega) \times (x_0 - x^U))}$$

and $$h^{NL}(x_m, \omega) = -Z(\omega) \times \sinh(\mu(\omega) \cdot x_m) \times \hat{q}(x^U, \omega)$$

where:

$Z(\omega)$ is a characteristic impedance given by $$Z(\omega) = \frac{\mu(\omega) \times a_{ve}(\omega)}{igA\omega R};$$

$\mu(\omega)$ is given by $$\mu(\omega) = \frac{1}{a_{ve}(\omega)} \sqrt{-\omega^2 + igA\omega R};$$

$g=9.81$ ms$^{-2}$ is the gravitational constant;

A is an area of the pipe area; and

R is a steady-state resistance of the pipe.

18. The method of claim 17, wherein the applying of MFP to $\vec{\Delta h}$ to estimate $x^L$ comprises:

plotting an objective function $$O(x^L) = \frac{\vec{\Delta h}^H \vec{G}(x^L) \vec{G}(x^L)^H \vec{\Delta h}}{\vec{G}(x^L)^H \vec{G}(x^L)}$$

on a graph with respect to $x^L$ to thereby allow a person to identify a particular value of $x^L$ corresponding to maximum $O(x^L)$ on the graph as an estimate of $x^L$, where:

$(\bullet)^H$ denotes complex conjugate transpose; and $\vec{G}(x^L)$ is an MK-dimensional column vector given by $$\vec{G}(x^L) = (G(x^L; x_m, \omega_k))_{m=1,2,\ldots,M;k=1,\ldots,K}$$

with $$G(x^L; x_m, \omega_k) = \begin{cases} -\frac{\sqrt{g} \times Z^2(\omega_k)}{\sqrt{2(H_0^L - z^L)}} \sinh(\mu(\omega_k) \times (x_m - x^L)) & x_m > x^L \\ \sinh(\mu(\omega_k) \times x^L) \hat{q}(x^U, \omega), & \\ 0, & x_m \leq x^L \end{cases}$$

in which $H_0^L$ is a pressure at $x^L$, and $z^L$ denotes an elevation of the pipe at $x^L$.

19. The method of claim 17, wherein $x^L$ is estimated from $\vec{\Delta h}$ by $$\hat{x}^L = \underset{x^U < x^L < x^D}{\operatorname{argmax}} \left( \frac{\vec{\Delta h}^H \vec{G}(x^L) \vec{G}(x^L)^H \vec{\Delta h}}{\vec{G}(x^L)^H \vec{G}(x^L)} \right)$$

where:

$\hat{x}^L$ is an estimate of $x^L$;

$(\bullet)^H$ denotes complex conjugate transpose; and $\vec{G}(x^L)$ is an MK-dimensional column vector given by $$\vec{G}(x^L) = (G(x^L; x_m, \omega_k))_{m=1,2,\ldots,M;k=1,\ldots,K}$$

with $$G(x^L; x_m, \omega_k) = \begin{cases} -\frac{\sqrt{g} \times Z^2(\omega_k)}{\sqrt{2(H_0^L - z^L)}} \sinh(\mu(\omega_k) \times (x_m - x^L)) & x_m > x^L \\ \sinh(\mu(\omega_k) \times x^L) \hat{q}(x^U, \omega), & \\ 0, & x_m \leq x^L \end{cases}$$

in which $H_0^L$ is a pressure at $x^L$, and $z^L$ denotes an elevation of the pipe at $x^L$.

20. The method of claim 15, wherein $h(x_m, \omega)$, $a_{ve}(\omega)$, $\hat{q}(x^U, \omega)$ and $h^{NL}(x_m, \omega)$ are computed or estimated at $\omega=\omega_1, \omega_2, \ldots, \omega_K$.

* * * * *